United States Patent
Rasanen (10) Patent No.: US 10,574,833 B2
(45) Date of Patent: Feb. 25, 2020

(54) CHARGING AND CONTROL OF EDGE SERVICES

(71) Applicant: NOKIA SOLUTIONS AND NETWORKS OY, Espoo (FI)

(72) Inventor: John Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/553,352

(22) PCT Filed: Feb. 26, 2015

(86) PCT No.: PCT/EP2015/054033
§ 371 (c)(1),
(2) Date: Aug. 24, 2017

(87) PCT Pub. No.: WO2016/134772
PCT Pub. Date: Sep. 1, 2016

(65) Prior Publication Data
US 2018/0077294 A1    Mar. 15, 2018

(51) Int. Cl.
*H04M 11/00* (2006.01)
*H04M 15/00* (2006.01)
(Continued)

(52) U.S. Cl.
CPC .... *H04M 15/8271* (2013.01); *H04L 12/1407* (2013.01); *H04M 15/66* (2013.01);
(Continued)

(58) Field of Classification Search
CPC ............. H04M 15/8271; H04M 15/66; H04M 15/8214; H04M 15/64; H04M 15/65; H04L 12/1407; H04W 4/001; H04W 4/24
(Continued)

(56) References Cited

U.S. PATENT DOCUMENTS 8,681,622 B2 * 3/2014 Chatterjee ......... H04W 28/0284
370/229
9,001,682 B2 * 4/2015 Kovvali ................ H04W 48/18
370/252
(Continued)

FOREIGN PATENT DOCUMENTS

WO    2012/045351 A1    4/2012
WO    2014/139553 A1    9/2014

OTHER PUBLICATIONS

International Search Report and Written Opinion dated Nov. 3, 2015 corresponding to International Patent Application No. PCT/EP2015/054033.
(Continued)

Primary Examiner — Marceau Milord
(74) Attorney, Agent, or Firm — Squire Patton Boggs (US) LLP (57) ABSTRACT

An apparatus, a method and a computer program product related to charging and control of edge services is provided. The apparatus comprises a processor and a memory for storing instructions to be executed by the processor, wherein the apparatus is connectable to a radio access network element and the processor is configured to provide a connection to a core network, to handle applications and/or services for a user equipment connected to the radio access network element, and to handle charging and/or policy control for the applications and/or services.

13 Claims, 5 Drawing Sheets

(51) Int. Cl.
 *H04L 12/14* (2006.01)
 *H04W 4/24* (2018.01)
 *H04W 4/50* (2018.01)

(52) U.S. Cl.
 CPC ......... *H04M 15/8214* (2013.01); *H04W 4/24* (2013.01); *H04M 15/64* (2013.01); *H04M 15/65* (2013.01); *H04W 4/50* (2018.02)

(58) Field of Classification Search
 USPC .......................................................... 455/406
 See application file for complete search history.

(56) References Cited

U.S. PATENT DOCUMENTS

| | | | |
|---|---|---|---|
| 9,253,696 B2* | 2/2016 | Rubin | G06F 11/00 |
| 9,270,559 B2* | 2/2016 | Raleigh | H04L 67/2804 |
| 9,357,469 B2* | 5/2016 | Smith | H04M 15/60 |
| 9,374,230 B2* | 6/2016 | Wang | H04L 41/0893 |
| 9,474,018 B2* | 10/2016 | Akhtar | H04W 48/18 |
| 9,509,519 B2* | 11/2016 | Wang | H04L 12/1407 |
| 9,622,254 B2* | 4/2017 | Wang | H04L 41/0893 |
| 9,628,579 B2* | 4/2017 | Li | H04L 12/14 |
| 9,654,357 B2* | 5/2017 | Fox | H04L 41/5025 |
| 2011/0171915 A1* | 7/2011 | Gomes | H04W 24/10 455/73 |
| 2011/0280143 A1* | 11/2011 | Li | H04L 12/14 370/252 |
| 2012/0166618 A1* | 6/2012 | Dahod | H04L 12/66 709/224 |
| 2012/0302244 A1* | 11/2012 | Sridhar | H04W 28/08 455/438 |
| 2013/0003699 A1* | 1/2013 | Liu | H04W 8/082 370/331 |
| 2013/0044705 A1* | 2/2013 | Akhtar | H04W 48/18 370/329 |
| 2013/0051326 A1* | 2/2013 | Jeyatharan | H04L 47/245 370/328 |
| 2013/0107799 A1* | 5/2013 | Karlsson | H04L 67/306 370/328 |
| 2013/0121324 A1* | 5/2013 | Kalmbach | H04L 67/2842 370/338 |
| 2013/0122856 A1* | 5/2013 | Kalmbach | H04L 67/2842 455/405 |
| 2013/0163424 A1* | 6/2013 | Goerke | H04W 24/02 370/235 |
| 2014/0355429 A1* | 12/2014 | Smith | H04W 28/0226 370/230 |
| 2014/0357285 A1* | 12/2014 | Smith | H04W 48/17 455/450 |
| 2014/0364094 A1* | 12/2014 | Blackwell | H04M 1/72583 455/414.1 |
| 2015/0117320 A1* | 4/2015 | Wang | H04L 41/0893 370/329 |
| 2015/0319686 A1* | 11/2015 | Hedberg | H04W 48/20 370/329 |
| 2016/0198514 A1* | 7/2016 | Wang | H04W 76/027 370/311 |
| 2016/0286463 A1* | 9/2016 | Cheng | H04W 48/02 |

OTHER PUBLICATIONS

"Mobile-Edge Computing; Mobile-edge_Computing_-_Introductory_ Technical_White_Paper_V1 Sep. 18, 2014" ETSI Draft; vol. LI-LI_ am, Dec. 16, 2014, pp. 1-36, XP014232595.

ETSI, "ISG MEC#1 Minutes of Plenary Meeting," ETSI; ITS(14)01_ 038, 2014, pp. 1-10.

3GPP TS 23.401 V13.1.0 (Dec. 2014), Technical Specification, "3rd Generation Partnership Project; Technical Specification Group Services and System Aspects; General Packet Radio Service (GPRS) enhancements for evolved Universal Terrestrial Radio Access Network (E-UTRAN) access (Release 13)," Dec. 2014.

Communication pursuant to Article 94(3) EPC corresponding to EP Appln. No. 15 711 665.8, dated Nov. 19, 2019.

* cited by examiner

CHARGING AND CONTROL OF EDGE SERVICES

FIELD OF THE INVENTION

The present invention relates to an apparatus, a method and a computer program product for charging and control of edge services.

RELATED BACKGROUND ART

The following meanings for the abbreviations used in this specification apply:
3GPP 3rd generation partnership project
ADC Application detection and control
CN Core network
eNB Evolved Node B, E-UTRAN Node B
EPC Evolved packet core
ETSI European telecommunications standards institute
GW Gateway
HSS Home subscriber server
ID Identity, Identifier
IP Internet protocol
ISG Industry specification group
LTE Long term evolution
MEC Mobile edge computing
MME Mobility management entity
PCC Policy and charging control
PCRF Policy and charging rules function
P-GW Packet data network gateway
QoS Quality of service
S-GW Serving gateway
SPR Subscription profile repository
TDF Traffic detection function
UDR User data repository
UE User equipment Embodiments of the present invention relate to the mobile edge computing (MEC). An MEC server is connected to a radio access network element such as an eNB or a radio network controller (RNC), wherein the MEC server provides applications and services to an UE attached to the eNB. The applications and services offered by a MEC server may be provided by different service providers.

MEC is further described for example in "Mobile-Edge Computing—Introductory Technical White Paper", September 2014 (Contributors: Huawei, IBM, Intel, Nokia Networks, NTT DOCOMO, Vodafone), and in ETSI ITS(14) 01_038: ISG MEC#1 Minutes of Plenary Meeting.

Figure 2:
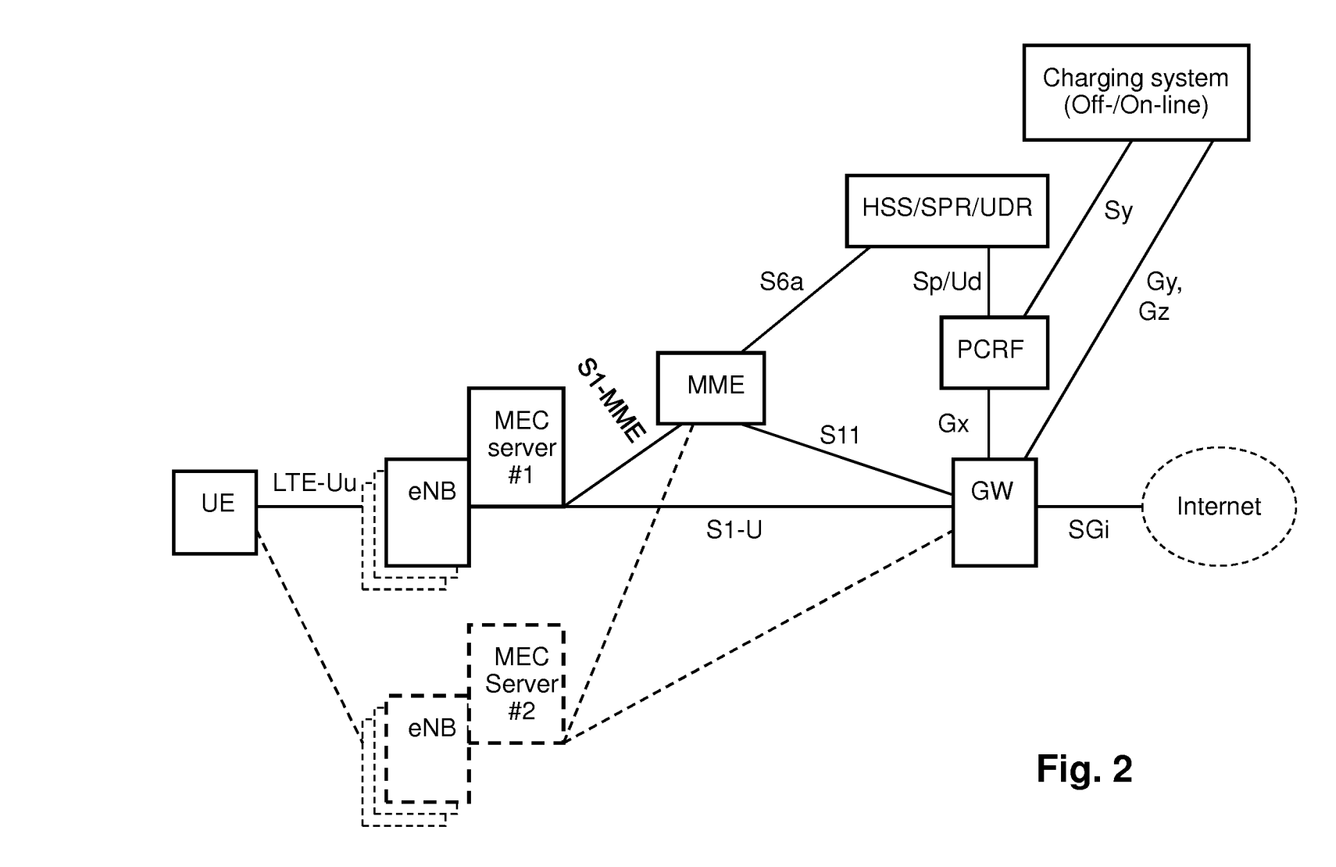
FIG. 2 shows a simplified architecture with MEC server at 3GPP radio network edge.

The currently assumed architectural environment is illustrated in the simplified example of FIG. 2. Further details concerning the MEC part can be found in the above-described "Mobile-Edge Computing—Introductory Technical White Paper", and further details concerning the 3GPP network part can be found e.g. in 3GPP TS 23.401.

Applications and services offered by a MEC server are used by 3GPP mobile network users/subscribers either in sessions between a UE and MEC server or as intermediate data flow manipulators in sessions between a UE and e.g. internet.

A mobile subscriber using MEC services in a session between the UE and MEC server shall somehow be charged for the usage of the radio resources and MEC applications and services, and the charging shall somehow be controlled.

If the current charging and charging control architecture and procedures are applied to applications and services offered by a MEC server, the basic idea of offering low latency applications and services to the users is pretty much lost. As per the current procedures, when an application or service is detected, the detection function in the GW makes an enquiry to the policy controller to fetch policy and charging control rules.

Applying the current policy and charging control and charging architecture to applications and services offered by a MEC server would also be an architecturally heavy solution, with several Diameter based interfaces between a MEC server and core network.

A mobile subscriber using MEC services in a session between the UE and e.g. internet, with a MEC server as intermediate data flow manipulator, shall somehow be charged for the usage of the radio resources, MEC services and core network resources. Current charging mechanisms in the core network charge on what is seen of the service data flows in the core network. This may be different from what is transferred in the radio network, due to the MEC applications/services manipulating the service data flows, and charging by the current core network procedures may not be just or justified. Moreover, the core network charging is not aware of the UE's resource usage on the MEC server.

The users of MEC applications and services are mobile network subscribers. Access control to and charging control on those applications and services may need to be mobile network subscriber specific in certain cases or circumstances.

SUMMARY OF THE INVENTION

Embodiments of the present invention address these situations and aim to overcome the above-described problems and to improve handling of applications and/or services offered by a mobile edge computing (MEC) server.

According to a first aspect of the present invention an apparatus is provided which comprises a processor and a memory for storing instructions to be executed by the processor, wherein the apparatus is connectable to a radio access network element and the processor is configured to provide a connection to a core network, to handle applications and/or services for a user equipment connected to the radio access network element, and to handle charging and/or policy control for the applications and/or services.

According to a second aspect of the present invention a method for controlling an apparatus connectable to a radio access network element is provided, the method comprising providing a connection to a core network, handling applications and/or services for a user equipment connected to the radio access network element, and handling charging and/or policy control for the applications and/or services.

The first aspect and the second aspect may be modified as follows:

For example, availability of the apparatus may be indicated to the core network when the user equipment has attached to the radio access network element.

Information regarding the applications and/or services for the user equipment may be indicated to the core network.

Charging and/or charging control and/or general policy control related capabilities may be indicated to the core network.

The capabilities may comprise one or more of the following:
offline charging,
online charging,
capability to identify and indicate service data flows that are chargeable by the apparatus and should be charged by the core network, capability to send corrective or complementary usage reports or charging records to the core network, capability to send resource monitoring results to the core network, and/or capability to receive usage or event monitoring instructions from the core network and to send monitoring results to the core network.

Available applications and/or services or available application classes and/or service classes may be indicated to the core network.

Moreover, access control and/or charging control and/or capability information may be received from the core network, and service data flows in connection with the applications and/or services for the user equipment connected to the radio access network element may be managed, controlled and/or routed, and related charging activities may be performed based on the received information.

A data flow between the user equipment and the core network may be detected, which is to be handled by an application provided by the apparatus, and resource usage of such a flow may be monitored.

Furthermore, a request may be sent to the core network indicating that monitoring of the resource usage is to be effected by the processor and not by the core network.

Information regarding the applications and/or services may be exchanged with the core network by using a container mechanism.

Furthermore, at least one interface may be provided which is configured to provide a connection to a core network control element involved with the applications and/or services for the user equipment connected to the radio access network element.

According to a third aspect of the present invention an apparatus is provided which comprises a processor and a memory for storing instructions to be executed by the processor, wherein the processor is configured to receive information regarding applications and/or services provided at a network element connectable to a radio access network element, to prepare information for performing charging and/or policy control for the applications and/or services, and to send the information to the network element.

According to a fourth aspect of the present invention a method is provided which comprises receiving information regarding applications and/or services provided at a network element connectable to a radio access network element, preparing information for performing charging and/or policy control for the applications and/or services, and sending the information to the network element.

The third aspect and the fourth aspect may be modified as follows:

For example, receive information regarding charging and/or charging control and/or general policy control related capabilities may be received from the network element, and the information for performing charging and/or policy control for the applications and/or services may be prepared based on the information received from the network element.

Monitoring results regarding a data flow between a user equipment and a core network which is to be handled by an application provided by the network element may be received from the network element.

A request to the core network indicating that monitoring of the resource usage is to be effected by the network element may be received from the network element, and monitoring of the resource usage by the core network may be inhibited.

Information regarding the applications and/or services may be exchanged with the network element by using a container mechanism.

According to a fifth aspect of the present invention a computer program product is provided which comprises code means for performing a method according to the second or fourth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

In the following, a general embodiment of the present invention is described by referring to FIG. 1.

Figure 1:
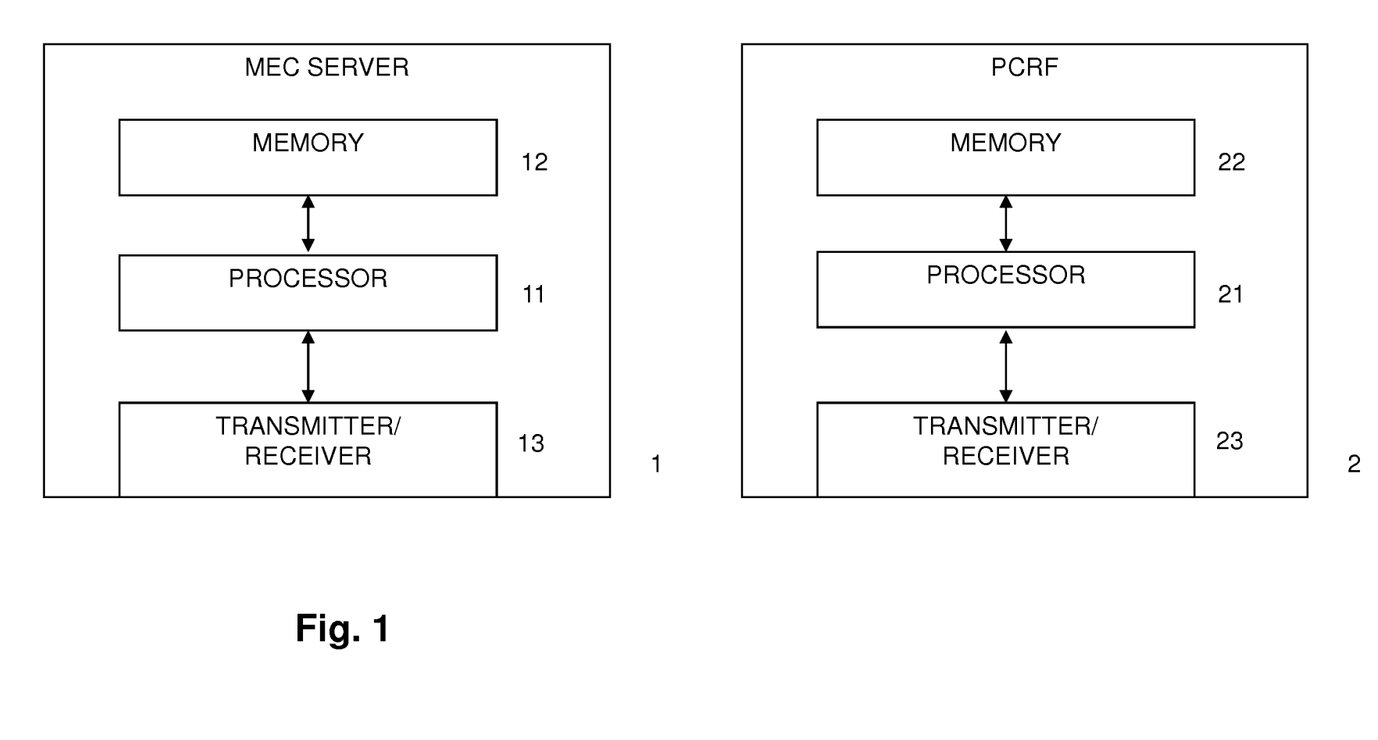
FIG. 1 shows a simplified structure of an MEC server and a GW according to an embodiment of the present invention.

In particular, FIG. 1 shows a MEC server 1 as an example for an apparatus which provides applications and/or services according to an embodiment of the invention. The MEC server 1 comprises a processor 11 and a memory 12 for storing instructions to be executed by the processor. The apparatus is connectable to a radio access network element (e.g., eNB), and the processor 11 is configured to provide a connection to a core network, to handle applications and/or services for a user equipment connected to the radio access network element, and to handle charging and/or policy control for the applications and/or services.

The MEC server 1 may also comprise a transmitter/receiver 13 which is configured to provide a connection with other network elements. Furthermore, The MEC server 2 is only an example for a corresponding network element, and instead also another network element providing corresponding applications and/or services can be applied. Moreover, the apparatus may also only be a part of the network element, e.g., a part of the MEC server. The apparatus may be located at the radio edge. The apparatus may be integrated with the radio access network control element or may be connected to the radio access network control element.

Furthermore, FIG. 1 shows a PCRF 2 as an example for an apparatus provided in the core network according to an embodiment of the invention. The PCRF 2 comprises a processor 21 and a memory 22 for storing instructions to be executed by the processor. The processor 21 is configured to receive information regarding the applications and/or services provided at a network element (e.g., the MEC server 1) connectable to a radio access network element, to prepare information for performing charging and/or policy control for the applications and/or services, and to send the information to the network element.

The PCRF 2 may also comprise a transmitter/receiver 23 which is configured to provide a connection with other network elements. The PCRF 2 is only an example for a corresponding core network control element, and instead also an MME or a P-GW could be applied as the apparatus. Moreover, the apparatus may also only be a part of the core network control element, e.g., a part of a PCRF, P-GW, MME or the like.

Thus, the MEC server 1 is capable of handling charging and/or policy control in connection with the applications and/or services offered by the MEC server. Hence, it is not necessary to handle charging control, enforcement etc. via the core network. In this way, the advantages of MEC can also be exploited when specific services are used for which dedicated charging control is required.

In the following, more detailed embodiments of the present invention are described.

In particular, in order to solve the problems as described in the introductory part of the description, the following actions are suggested. It is to be noted that the actions can be applied in various combinations depending on which of the problems need to be addressed in the prevailing circumstances.

In the following, actions are described when a UE enters the area of a MEC server. It is referred to FIGS. 3 to 5, which are described in more detail below.

When a MEC server notices that a UE has attached to an eNB connected to the server (e.g. upon initial UE attach to the network or due to a handover to an eNB that is connected to the MEC server), the MEC server indicates the availability of itself to the core network.

The MEC server may also indicate its charging and/or charging control or in general policy control related capabilities to the core network. Indicated capabilities may be e.g.:
 Offline charging
 Online charging
 A capability to identify (e.g. through service data flow filters) and indicate service data flows that can be charged by the MEC server and should not be charged by the core network. This is further elaborated below referring to FIG. 5.
 A capability to send corrective or complementary usage reports or charging records to the core network charging gateway. With this capability the charging performed in the core network can be complemented or corrected with what the MEC server sees as resource usage on the radio network and MEC server, not seen by the core network. As an example, the amount of downlink data on the radio leg may, due to the manipulation by a MEC server application, be smaller than the downlink data of the same service data flow monitored by the core network gateway, and the MEC server may send a corresponding downwards correction to the core network gateway. This capability can be used to avoid requirements for the charging system to perform more or less complicated charging synchronization actions to produce the final charging from the different results received from the MEC server and core network.
 A capability to send resource monitoring results to/via the core network charging gateway. With this capability the charging data records can be created in the core network charging gateway, freeing the MEC server from having separate interfaces to the charging system.
 A capability to receive usage or event monitoring instructions from the core network and to send monitoring results to the core network gateway. With this capability the policy and charging control function (PCRF) may get usage or event monitoring results from the MEC server (refer to FIG. 3 steps A15 and A16 and FIG. 5 steps C8 and C9) and use them e.g. for possible charging control purposes, i.e. update related charging parameters accordingly, or in general for policy control purposes.

The MEC server may also indicate its available applications and services, or application classes and service classes, to the core network.

The core network may use MEC availability information to check whether the subscriber has a right to use the MEC services in general or the services of this particular identified MEC server, or whether the access is denied. The core network may indicate this in a response to the MEC server.

If the core network received charging and/or charging control related capabilities from the MEC server and supports at least some of them, the core network acknowledges and may indicate which capabilities can be used between the MEC server and the core network.

The core network may further use the information about the offered applications and services, or application classes and service classes, to check which of the offered ones are allowed or denied to the subscriber, and indicate these on a per application and service or application class and service class granularity in the response to the MEC server.

The core network may further use the information about the applications and services, or application classes and service classes, offered and allowed to the user, to create charging parameters on a per application and service or application class and service class granularity in the response to the MEC server.

The MEC server may use the access control and/or charging control and/or capability information received from the core network to manage, control and route the detected service data flows and perform related charging activities accordingly as long as the UE stays in the area of the MEC server or the information is updated.

In the following, actions are described when a UE is in the area of a MEC server, refer also to FIG. 5.

If a MEC server detects a flow to be handled/manipulated by a MEC application and to be routed back to EPC level, the MEC server, being the only entity that knows exactly what is being transmitted between the MEC server and UE and what between the MEC server and core network, performs the resource usage monitoring of such a flow. For this action the MEC server may use the charging and/or control parameters received earlier from the core network.

In order to avoid double charging, the MEC server requests the core network gateway to not monitor the resource usage of the related flow. The request sent by the MEC server to the core network identifies the related flow e.g. by a flow filter.

The core network gateway may discard possible monitoring results already got for the flow before receiving the request from the MEC server.

The MEC server takes care of the monitoring of the resource usage of the flow on both legs (i.e. between itself and the UE and between itself and the core network) and reports the results to charging.

In the following, the above actions are described by referring to the signaling diagrams shown in FIGS. 3 to 5.

Figure 3:
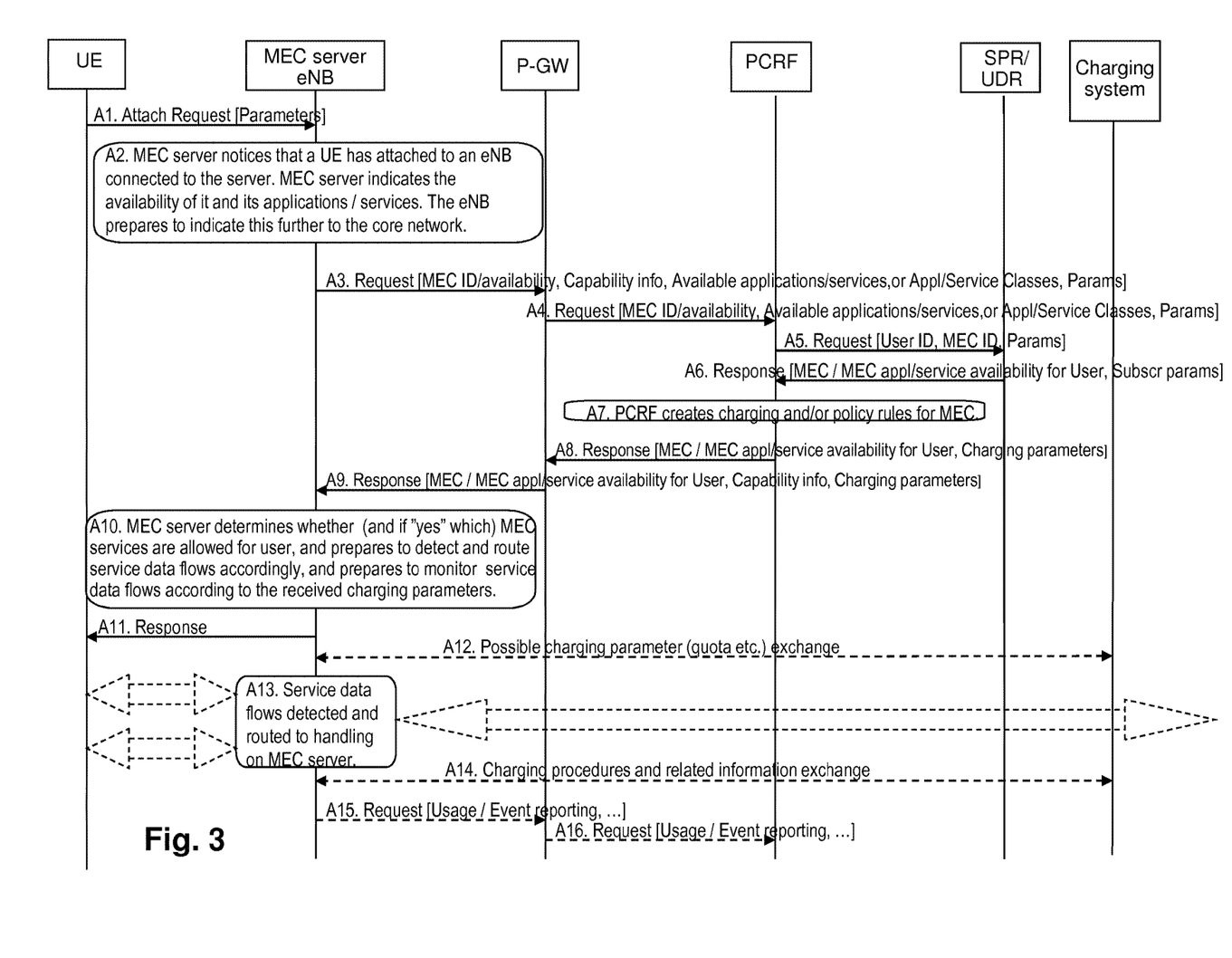
FIG. 3 shows an UE attach signalling scenario with P-GW and PCRF involved according to an embodiment of the present invention.

FIG. 3 shows an UE attach signalling scenario with P-GW and PCRF involved. In particular, the UE attaches to an eNB to which a MEC server is integrated or connected. Network elements of the core network involved in this scenario comprise a P-GW, a PCRF, SPR/UDR and a charging system.

In step A1, the UE sends an Attach Request to the eNB/MEC server. The Attach Request may comprise different parameters, e.g. user ID and requested service(s) or QoS. In step A2, the MEC server notices that a UE has attached to an eNB connected to the server. MEC server indicates the availability of it and its applications/services. The eNB prepares to indicate this further to the core network. Thus, in step A3, the eNB sends a request (including MEC ID/availability, Capability info, Available applications/services, or Application/Service Classes, Parameter) to the P-GW. The P-GW then forwards this request to the PCRF in step A4. The PCRF then requests the SPR/UDR for information regarding the user. That is, in step A5 the PCRF sends a request (including User ID and possibly MEC ID and other parameters) to the SPR/UDR, which then sends a response in step A6 with the necessary information (e.g. MEC/MEC appl/service availability for User, Subscriber Parameter). In step A7, the PCRF creates charging and/or policy rules for MEC. In step A8, the PCRF sends a response including the necessary information (e.g. MEC/MEC appl/service availability for User, Charging parameters) to the P-GW, which in turn forwards this to the MEC server/eNB in step A9.

Thus, in step A10, the MEC server determines whether (and if "yes" which) MEC services are allowed for user, and prepares to detect and route service data flows accordingly, and prepares to monitor service data flows according to the received charging parameters. In step A11, the MEC server sends a corresponding response to the UE. After this, the UE can use the corresponding applications and/or services. If required, possible charging parameters (quota etc.) may be exchanged between the MEC server and the charging system in A12. The service data flows are detected and routed to handling on the MEC server in step A13. After or during using the corresponding applications and/or services, charging procedures and related information may be exchanged between the MEC server and the charging system, as indicated in step A14. Moreover, also reporting may be carried out. As indicated in A15, the MEC server may send a corresponding request (including usage/event reporting) to the P-GW, which forwards this to the PCRF in step A16.

Figure 4:
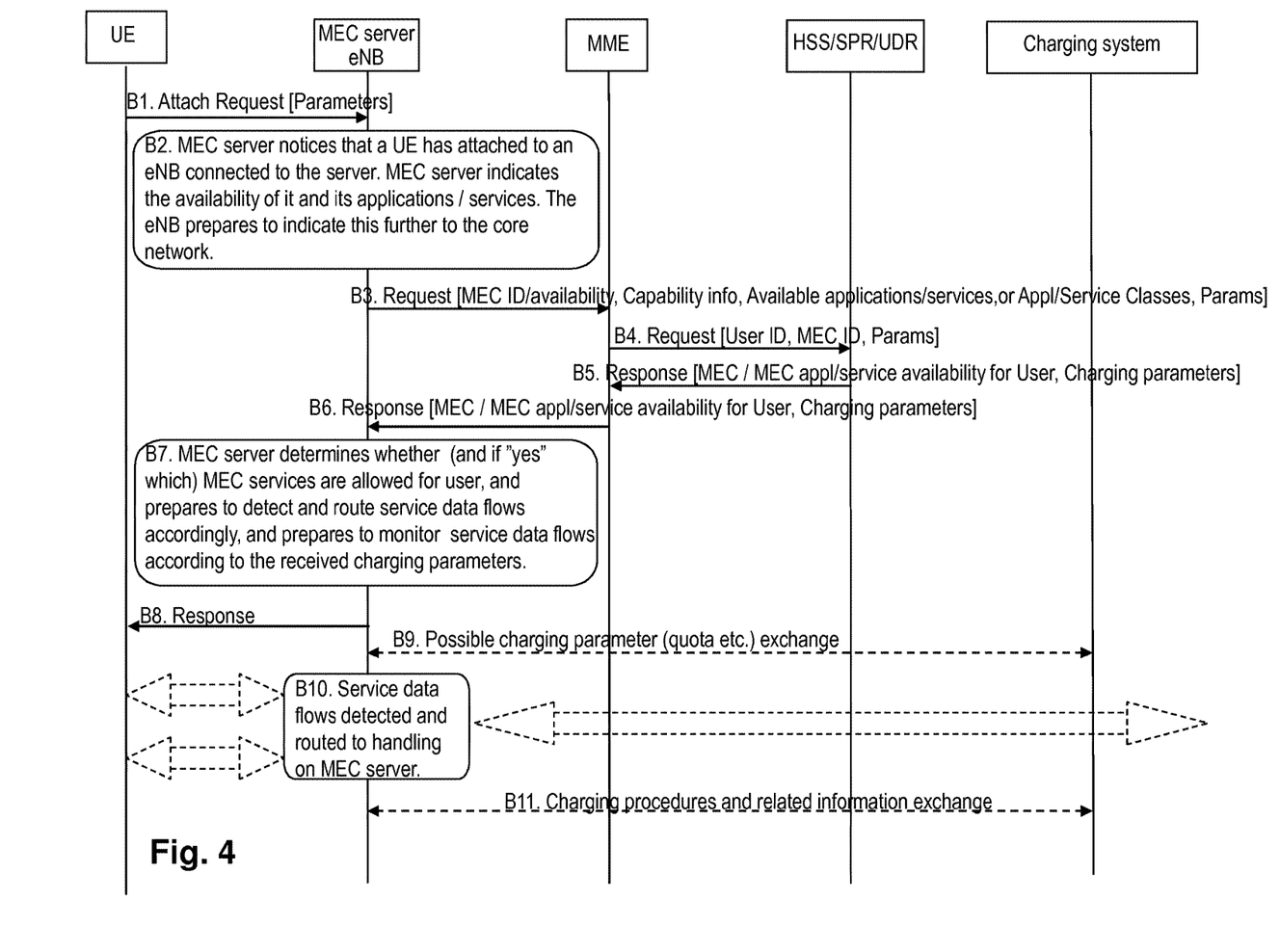
FIG. 4 shows a simplified signalling and operations scenario with MME involved according to an embodiment of the present invention.

FIG. 4 shows a simplified signalling and operations scenario with MME involved. In this example, similar as in connection with the scenario shown in FIG. 3, the UE attaches to an eNB to which a MEC server is integrated. Network elements of the core network involved in this scenario comprise an MME, a HSS/SPR/UDR and a charging system. The scenario is similar to that of FIG. 3 except that the actions performed at the PCRF (in connection with the P-GW) are performed at the MME.

In particular, in step B1, the UE sends an Attach Request (which may comprise different parameters, e.g. user ID and requested service(s) or QoS) to the eNB/MEC server, and in step B2, the MEC server notices that a UE has attached to an eNB connected to the server. MEC server indicates the availability of it and its applications/services. The eNB prepares to indicate this further to the core network. Thus, in step B3, the eNB sends a request (including MEC ID/availability, Capability info, Available applications/services, or Application/Service Classes, Parameter) to the MME. In step B4 the PCRF sends a request (including User ID and possibly MEC ID and other parameters) to the HSS/SPR/UDR, which then sends a response in step B5 including the necessary information (e.g. MEC/MEC appl/service availability for User, charging parameters).

In step B6, the MME sends a response including the necessary information (e.g. MEC/MEC appl/service availability for User, Charging parameters) to the MEC server.

After this, the procedure is the same as described in FIG. 3 in steps A10 to A14. That is, in step B7, the MEC server determines whether (and if "yes" which) MEC services are allowed for user, and prepares to detect and route service data flows accordingly, and prepares to monitor service data flows according to the received charging parameters. In step B8, the MEC server sends a corresponding response to the UE. After this, the UE can use the corresponding applications and/or services. If required, possible charging parameters (quota etc.) may be exchanged between the MEC server and the charging system in B9. The service data flows are detected and routed to handling on the MEC server in step B10. After or during using the corresponding applications and/or services, charging procedures and related information may be exchanged between the MEC server and the charging system, as indicated in step B11.

Although not shown in FIG. 4, also reporting may be carried out in various ways. For example, the MEC server may send a corresponding request (including e.g. charging data and/or usage/event reporting) to the P-GW or MME, possibly to be further sent to the charging system if/when applicable.

Figure 5:
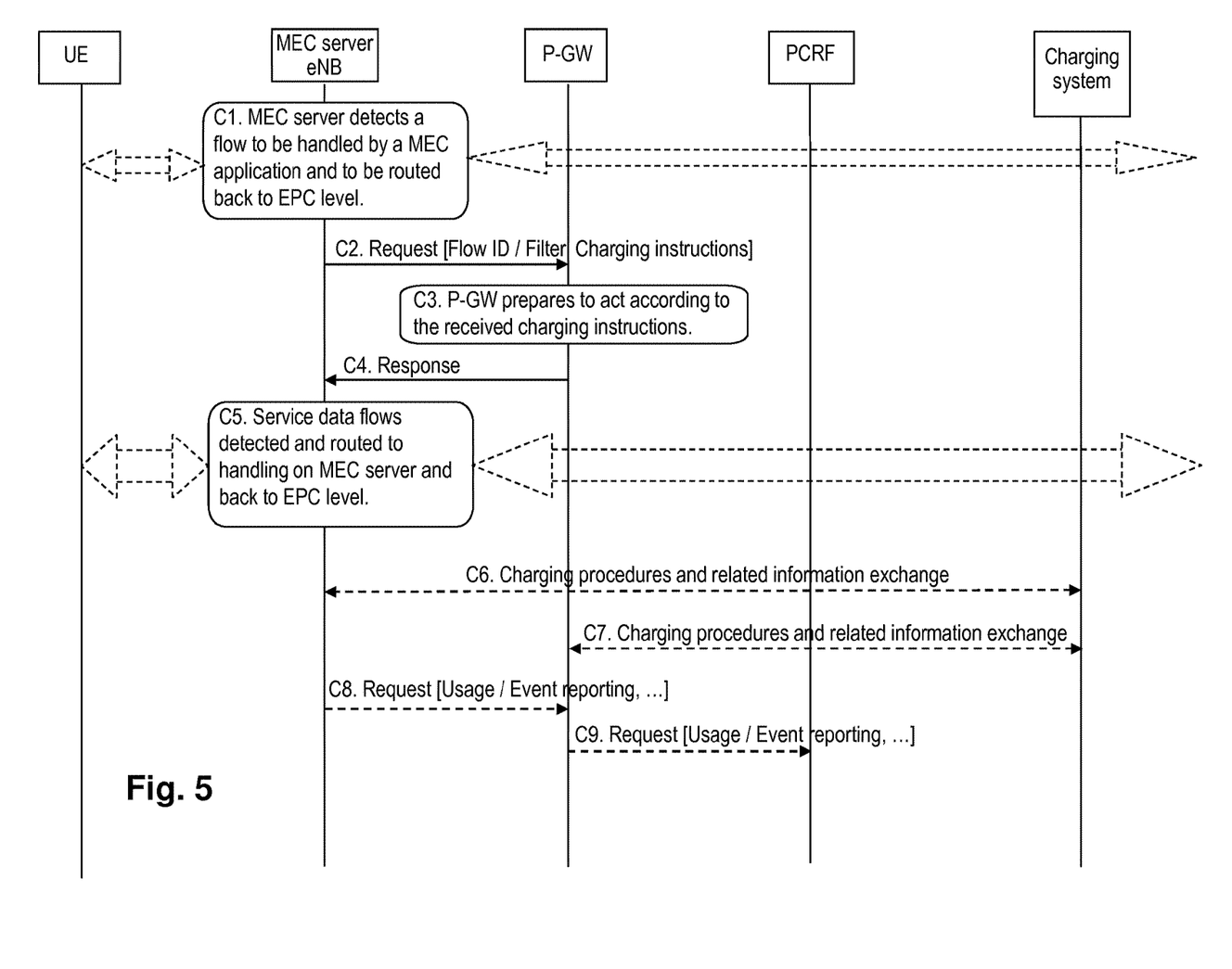
FIG. 5 shows a signalling scenario on synchronization of charging between MEC and CN according to an embodiment of the present invention.

FIG. 5 shows a signalling scenario on synchronization of charging between MEC and the core network (CN). In particular, similar as in case of FIG. 3, a scenario is illustrated in which a UE is connected to the MEC server/eNB. Network elements of the core network involved in this scenario comprise the P-GW, the PCRF and a charging system.

In step C1, the MEC server detects a flow to be handled by a MEC application and to be routed back to EPC level. In step C2, the MEC server sends a corresponding request including Flow ID/Filter, charging instructions to the P-GW. In step C3, the P-GW prepares to act according to the received charging instructions, and sends a corresponding response to the MEC server in step C4. Thus, in step C5, service data flows are detected and routed to handling on MEC server and back to EPC level.

After or during using the corresponding applications and/or services, charging procedures and related information may be exchanged between the MEC server and the charging system, as indicated in step C6, similar as described in above in connection with step A14 in FIG. 3. In addition, also the P-GW may exchange the charging procedures and related information with the charging system, so that the P-GW is aware of possible changes etc. Furthermore, also reporting may be carried out. As indicated in C8, the MEC server may send a corresponding request (including usage/event reporting) to the P-GW, which forwards this to the PCRF in step C9.

Although not shown, a scenario on synchronization of charging between MEC and CN involving an MME (similar as shown in FIG. 4) would be similar to the scenario shown in FIG. 5 with the exception that the corresponding requests would be exchanged between the MEC server and the P-GW or MME instead of the PCRF.

In the following, some implementations of the above embodiments are described. In particular, various architectural solutions are possible.

In an extreme case the MEC server does have to have any dedicated interfaces to the charging system, which corresponds to the case shown in FIG. 2. In this case, the MEC server and core network may use existing 3GPP network interfaces and control signaling messages. The new parameters and data exchanged between the MEC server and core network (e.g., P-GW and PCRF, or MME) may use container mechanisms available in the messages, e.g. the Protocol Configuration Options (PCO) available on the EPC bearer control signaling. There are two different ways to use the existing interfaces and messages:

As the first way, the EPC bearer control signaling may be used between the MEC server and the GW (S-GW or preferably P-GW) transparently via the MME. In this case, the GW may be the interworking point between the control and monitoring operations in the core network and MEC server and the creator of charging data records including in them the information produced by the MEC server. The GW may get subscription information from the SPR/UDR as per current 3GPP procedures via the PCRF. The GW may use the existing charging interfaces (Gy, Gz) and charging procedures.

As the second way, if PCRF is not available or otherwise not used, the MEC server may get subscriber specific charging characteristics from the MME (which gets the information from the HSS). But again, the GW may be used as the common contact point to the charging system.

The use of container mechanisms of existing bearer control signaling makes the information exchange between the MEC server and core network entity (e.g. P-GW) transparent to other network entities and thus allows also proprietary implementations (of at least some of the actions suggested in this report) without any public standardization. But standardization provides compatibility between MEC servers from different venders and core network entities from different venders.

In another extreme case the MEC server supports the full set of 3GPP charging and charging control interfaces, i.e. the interfaces Gy, Gz and Gx in FIG. 2. In this case service data flows between the UE and MEC server without core network leg may obviously be charged independently of the core network. Service data flows that return from the MEC server handling to the EPC level obviously still need monitoring/charging coordination between the radio leg and core network leg. For example, the MEC server may indicate the core network the service data flow(s) that is/are charged or monitored by the MEC server and shall not be charged or monitored by the core network, or the MEC server may send charging or monitoring correction requests to the core network, as described earlier.

Anything between the two extreme solutions described above is possible, e.g., that only some interfaces are provided for the MEC server.

Different implementations described above may be preferred in different circumstances, depending e.g. on which kind of applications and services are offered by the MEC server and who provides the applications and services and who operates the server.

It is noted that the present invention is not limited to the embodiments described above. In particular, modifications and variations are possible.

For example, in the above embodiments, the MEC server is integrated in an eNB. However, embodiments of the invention are not limited to this, and the MEC server or a corresponding apparatus may be integrated into any kind of radio access network (RAN) element, for example into a radio network controller (RNC) or other suitable elements, by which a direct connection to an eNB or an LTE base station or the like can be provided, or the MEC server may be a standalone entity connected to a radio network entity (or entities) via a proper interface.

According to another aspect of embodiments of the present invention, an apparatus is provided which is connectable to a radio access network element and which comprises means for providing a connection to a core network, means for handling applications and/or services for a user equipment connected to the radio access network element, and means for handling charging or policy control for the applications and/or services.

According to a further aspect of embodiments of the present invention, an apparatus is provided which comprises means for receiving information regarding applications and/or services provided at a network element connectable to a radio access network element, means for preparing information for performing charging and/or policy control for the applications and/or services, and means for sending the information to the network element.

It is to be understood that any of the above modifications can be applied singly or in combination to the respective aspects and/or embodiments to which they refer, unless they are explicitly stated as excluding alternatives.

For the purpose of the present invention as described herein above, it should be noted that
- method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus, comprising: a processor; and a memory for storing instructions to be executed by the processor, wherein the apparatus is a mobile edge computing server connectable to a radio access network element and the processor is configured to: exchange information with a core network; handle applications or services for a user equipment connected to the radio access network element; handle charging or policy control for the applications or services; indicate information regarding at least one of: applications or services for the user equipment, charging or charging control related capabilities, and general policy related capabilities to the core network; receive access control or charging control or capability information from the core network; manage, control, or route service data flows in connection with the applications or services for the user equipment connected to the radio access network element; and perform related charging activities based on the received information.

2. The apparatus according to claim 1, wherein the capabilities comprise one or more of the following:
   offline charging;
   online charging;
   capability to identify and indicate service data flows that are chargeable by the apparatus and should be charged by the core network;
   capability to send corrective or complementary usage reports or charging records to the core network;
   capability to send resource monitoring results to the core network; or
   capability to receive usage or event monitoring instructions from the core network and to send monitoring results to the core network.

3. The apparatus according to claim 1, wherein the processor is further configured to indicate available applications or services or available application classes or service classes to the core network.

4. The apparatus according to claim 1, wherein the exchange of information is triggered by one of a user equipment attaching to the network and/or a service data flow being detected between the user equipment and network.

5. An apparatus, comprising: a processor; and a memory for storing instructions to be executed by the processor, wherein the processor is configured to: prepare information for performing charging or policy control for applications or services based on information received from a network element; receive a request including at least one of: a mobile edge computing identifier, a mobile edge computing availability, capability information, and available applications; create charging and policy rules for the mobile edge computing server; and transmit indications of one or more mobile edge computing applications, user equipment service availability, and one or more charging parameters.

6. The apparatus according to claim 5, wherein the processor is further configured to: receive the information regarding charging or charging control or general policy control related capabilities from the network element.

7. A method for controlling a mobile edge computing server connectable to a radio access network element, the method comprising: exchanging, by the mobile edge computing server, information with a core network; handling, by the mobile edge computing server, charging or policy control for the applications or services; indicating, by the mobile edge computing server, information regarding the application or services for the user equipment, charging or charging control related capabilities, and general policy control related capabilities to the core network; receiving, by the mobile edge computing server, access control or charging control or capability information from the core network; and managing, controlling, or routing, by the mobile edge computing server, service data flows in connection with the applications or services for the user equipment connected to the radio access network element; and performing, by the mobile edge computing server, related charging activities based on the received information.

8. The method according to claim 7, wherein the capabilities comprise one or more of:
   offline charging;
   online charging;
   capability to identify and indicate service data flows that are chargeable by the apparatus and should be charged by the core network;
   capability to send corrective or complementary usage reports or charging records to the core network;
   capability to send resource monitoring results to the core network; or
   capability to receive usage or event monitoring instructions from the core network and to send monitoring results to the core network.

9. The method according to claim 7, further comprising: indicating available applications or services or available application classes or service classes to the core network.

10. A computer program product comprising computer-readable code, embodied on a non-transitory computer-readable medium, wherein, when run on a processor, the computer-readable code controls the processor to perform the method of claim 7.

11. The method according to claim 7, wherein the exchange of information is triggered by one of a user equipment attaching to the network and/or a service data flow being detected between the user equipment and network.

12. A method, comprising: preparing, by a radio access network element connectable to a mobile edge computing server, information for performing charging or policy control for applications or services based on information received from a network element; receiving, by the radio access network element, a request including a mobile edge computing identifier, a mobile edge computing availability, capability information, and available applications; creating, by the radio access network element, charging and policy rules for a mobile edge computing server; and transmitting, by the radio access network element, indications of one or more mobile edge computing applications, user equipment service availability, and one or more charging parameters.

13. The method according to claim 12, further comprising: receiving the information regarding charging or charging control or general policy control related capabilities from the network element.

* * * * *

UNITED STATES PATENT AND TRADEMARK OFFICE
CERTIFICATE OF CORRECTION

PATENT NO. : 10,574,833 B2
APPLICATION NO. : 15/553352
DATED : February 25, 2020
INVENTOR(S) : John Juha Antero Rasanen Page 1 of 1

It is certified that error appears in the above-identified patent and that said Letters Patent is hereby corrected as shown below:

In the Claims

Claim 7, Column 12, Line 4:
Please change "network; handling"
To --network; handling, by the mobile edge computing server, applications or services for a user equipment connected to the radio access network element; handling--

Signed and Sealed this
Twenty-second Day of December, 2020

Andrei Iancu
*Director of the United States Patent and Trademark Office*